United States Patent [19]

Swager

[11] 4,102,124
[45] Jul. 25, 1978

[54] LOCKING CLEVIS OR THE LIKE

[76] Inventor: William E. Swager, P. O. Box 656, Fremont, Ind. 46737

[21] Appl. No.: 704,628

[22] Filed: Jul. 12, 1976

[51] Int. Cl.$^2$ ............... F16B 21/00; F16G 13/06
[52] U.S. Cl. ........................... 59/86; 403/6; 403/9; 403/154; 403/157; 85/5 N
[58] Field of Search ............ 85/5 N, 5 CP, 5 B; 151/6; 403/9, 6, 154, 328, 157; 59/86, 93

[56] References Cited

U.S. PATENT DOCUMENTS

| | | | |
|---|---|---|---|
| 389,335 | 9/1888 | Spear | 403/328 |
| 1,852,071 | 4/1932 | Becker | 403/328 X |
| 2,209,007 | 7/1940 | Stevenson | 59/86 |
| 2,369,344 | 2/1945 | Ehmann | 59/86 |
| 2,399,581 | 4/1946 | Spooner | 403/157 |
| 2,420,256 | 5/1947 | MacKenzie | 59/86 |
| 2,476,617 | 7/1949 | Mueller | 403/9 |
| 2,563,166 | 8/1951 | Gardner | 403/9 |

*Primary Examiner*—Andrew V. Kundrat

[57] ABSTRACT

A pin or bolt slidingly supportable in rings at opposite ends, or throughout its body in a sleeve, such as through the eyes of a clevis, is usefully locked against axial displacement by a radially sliding spring-biased detent which fits into a groove of a supporting ring or sleeve, securing it against axial displacement. The supporting ring has a slot extending inward from a support surface and sized to receive a key, such as a disc or a coin, which may be inserted in the slot to engage and depress the detent against its biasing spring, sufficient to displace it from the groove of the ring and thus unlocking and allowing the pin to be displaced in its support by sliding therefrom axially. In a modified form, where the supporting rings of a clevis are dimensioned so small that the radially cut slot would tend to weaken them, the ends of the pin may be secured by extra annular rings or washers mounted adjacent to the main supporting rings of the clevis. In the modified form the extra locking rings are sized to receive the internal groove for retaining the tip of the spring biased detent, as well as the slot cut radially into the additional ring, through which the key-like coin is inserted for radial displacement of the detent and thus releasing a locked pin for axial movement. In a second modification the key may be a small plate resiliently supported in a slot between resilient pads in a keyway groove cut in a clevis ring from which the outer end of the key extends, allowing a finger to be inserted to press against the key plate, pressing it against the tip of the detent for unlocking the pin for axial movement.

18 Claims, 19 Drawing Figures

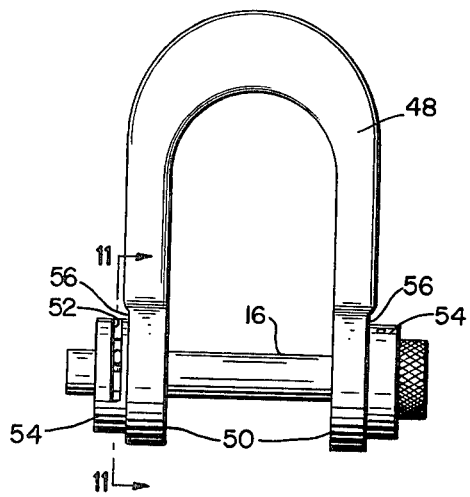
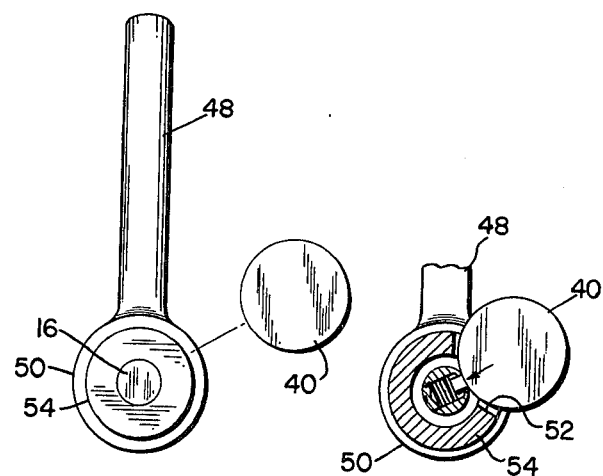
FIG.9　　　FIG.10　　　FIG.11
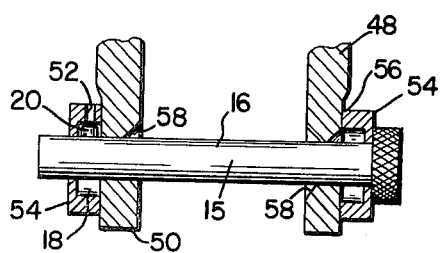
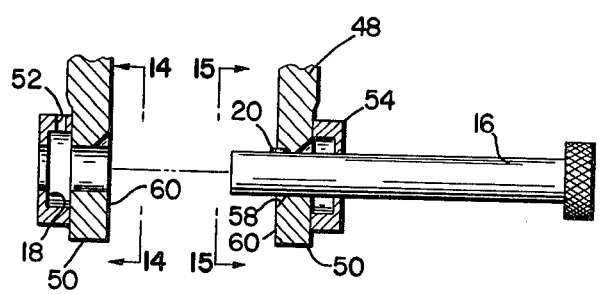
FIG.12　　　FIG.13
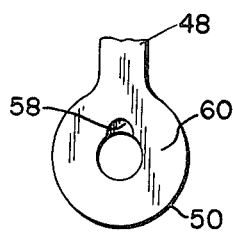
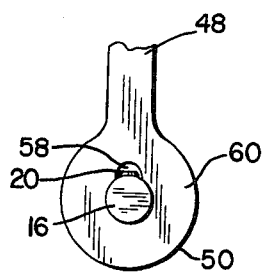
FIG.14　　　FIG.15

LOCKING CLEVIS OR THE LIKE

This invention relates to a locking pin adapted for insertion in parallel supported locking rings, such as the eyes of a clevis, the pin having locking means at either or both ends for locking the pin against axial displacement in one or both supporting rings, and more particularly a locking pin is provided for a clevis having at least one end locked into an eye to prevent axial displacement.

There are numerous uses for an axially slidable retaining pin, bolt or the like, supported at opposite ends, or in a sleeve throughout its length, in which the pin is usefully locked and unlocked from an operative position. For instance, the pin may be axially slidably engaged by a pair of supporting eyes or annular rings at opposite sides of a clevis to be engaged by a hook of a hoist or derrick and which may be fastened heavy weights for pulling movement thereby, and in which such pin or bolt forms one element of the support of a cable or chain. Such pin or bolt is usefully secured by locking against displacement by axial movement in a position critically important. Again, such pin or bolt may be merely the sliding bolt for completing a link of a chain. In such use it is desirable that the pin be securely locked in its operating position against displacement, and it is also necessary that it be easily unlocked for fast removal from its position of locked engagement.

In broad aspect, the invention is directed to a pin or bolt slidably mounted in parallel opposite supporting rings or eyes, and having means for locking a supported end of the pin in at least one ring to prevent axial movement. In preferred construction the pin carries a locking means securing the pin against axial displacement within an eye of a clevis (hereinafter referred to as a ring) while allowing free rotation of the pin in the locked position. The locking means is preferably a spring biased detent having a tip fitting in a groove of the ring locking the pin against axial withdrawal. The detent engages and may rotate in the retaining groove in locked position, while preventing axial withdrawal of the pin from the ring support.

The ring preferably has a slot radially cut inward from an outer peripheral position, sufficient to receive a disc-like key which can engage and depress the tip of the detent against its biasing force below the sides of the retaining groove, thereby unlocking the pin for axial movement and allowing its sliding withdrawal from the eye. In this manner the pin remains firmly locked in a pair of supporting rings or eyes, such as rings of a clevis, or even links of a chain or any other supporting pin structure, in which a lockable sliding pin may be used. Thus, the pin is usefully supported at opposite ends in any functional structure in which the pin needs securely to remain locked therein against axial displacement, but conveniently and deliberately removable by inserting a key, such as a disc, when unlocking and thus preventing accidental withdrawal of the pin.

In another aspect, one or two rings having an interal locking groove may be fastened to one or both sides of the pin-supporting eyes of a clevis when such eyes normally are sized too small for them to have locking and retaining grooves cut therein without seriously weakening the structure.

The invention is further described in conjunction with the drawings herein:

FIG. 9 is a modified form of the device in which rings or collars are mounted separately to the outer faces of the eyes of the clevis and about the ends of the pin for locking an end of the pin to a smaller clevis;

FIG. 10 is an elevational end view of FIG. 9 illustrating the combination with a disc-like key;

FIG. 11 is similar to FIG. 10 illustrating the use of the unlocking key having a portion of the locking sleeve cut open and in section taken on a line 11—11 of FIG. 9, combined with the mounting of an unlocking key for unlocking;

FIG. 12 is an elevational view similar to FIG. 9 with both eyes and sleeves of the clevis cut away and in section;

FIG. 13 is similar to FIG. 12 illustrating the manner of locking removal of the pin in axial sliding movement;

FIG. 14 is an elevational detail of an eye of the clevis from which the pin is withdrawn, taken on the line 14—14 of FIG. 13;

FIG. 15 is a similar elevational detail of an eye of the clevis from which the pin is withdrawn, taken on the line 15—15 of FIG. 13;

Figure 1:
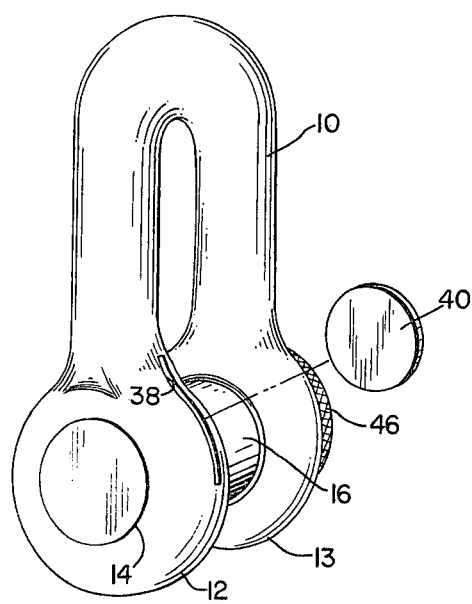
FIG. 1 illustrates the clevis in perspective having a pin mounted for support between both eyes as in normal locked use.

As shown in the several figures, a clevis comprising a U-shaped bar 10, terminates in a pair of eyes 12 & 13. The eyes are bored centrally in the flared clevis ends thereof at 14, to receive in axially sliding and rotating fit a pin 16, centrally of the bores 14. Internally of each ring or eye 12 & 13 is further cut concentric grooves 18, adjacent to the bore 14, and of sufficient depth to slidingly receive the tip 20 mounted on the outer end of a detent 22, as shown in FIGS. 3–7.

At least the one outer end of the pin 16, is radially bored with an enlarged diameter D to slidingly receive the body of the detent 22. It is bored diametrically inward in a bore 24 from one tangential point, but which terminates before passing through the pin to leave a shoulder 26 against which the enlarged diametric portion of the detent 22 will bear as a stop. The bore 24 continues in a smaller diameter 28 completing the total diametric bore to allow the tip of the detent 20 to pass through and protrude above the diametric opposite surface of the pin. Thus the tip 20 of the detent slides in the bore 14 between cylindrical pin surfaces of the pin 16, and lies within the groove 18 for retaining the pin therein against axial movement, but allows rotation of the pin in the bore 14.

The opposite end of the bore 24 is threaded at 30 to receive the set screw 32 which carries a retaining projection of tip 34 about which is supported an outer end of a spring 36, whereby the spring 36 is supported at one end upon the pin 34 and the other is biased in compression against the inner end of the detent 22. Thus the spring 36 biases the detent radially against the shoulder stop 26 and resiliently supports the tip 20 within the groove 18 as a detent. In this manner the tip of the detent 20 locks the pin 16 holding it within the sides of the groove 18, in which position it may be rotated while preventing axial movement of the pin 16 in ring 12. Ring 13 also has a groove 18 so that the end of pin 16 will also lock there. Thus the detent supports and locks the pin within either or both supporting eyes 12 & 13.

A slot 38 is cut inward from any convenient annular position of the ring or eyes 12 & 13, preferably at a point near the support juncture of the rings 12 & 13 with the bent bar 10 of the clevis. Slot 38 is further sized to receive a round disc forming a key which may be inserted in the slot 38 and with the tip of the detent rotated to a position intercepting the slot 38. The disc 40 inserted will depress the tip 20 of the detent against the bias of the spring 36, but will depress the tip 20 of the detent radially inward from the slot 38 as well as groove 18 and thus unlock and allow the pin 16 to be slidably displaced axially from support of the eyes 12 & 13. In this manner the disc 40 serves to unlock the pin 16 by depressing the detent from its retaining groove 18 and allow axial sliding movement thereof.

Figure 7:
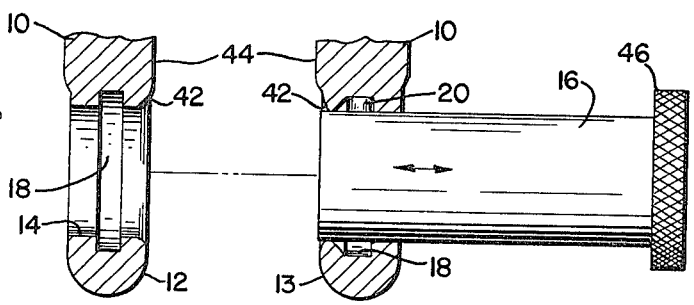
FIG. 7 illustrates the continuing sliding position of FIG. 6 with the pin withdrawn progressively further into the second eye.

The inner edges 42 of each bore 14 of the eyes 12 & 13 are rounded or chamfered to serve as a sliding guide in which the tip 20 of the detent will bear and be slidingly depressed in axial movement of the pin 16 against opposite inner faces 44 of each eye or ring 12 & 13. Thus, in sliding movement of the pin 16, the tip of the detent 20 engages the angular or rounded surface 42 and is slidingly depressed to allow the pin to be slid into each eye 12 & 13 depressing the detent radially with the axial movement of the pin. As the pin 16 is further axially slid in withdrawal movement it will engage the groove 18 within the eye 12 & 13 and still be retained therein in open or unlocked position of the clevis as shown in FIG. 7. In that position the pin will also lock within the eye 12 & 13 and similarly be retained ready for use. Thus the pin may be locked both closed as in FIGS. 1–5, or locked in the open position as in FIG. 7.

Figure 8:
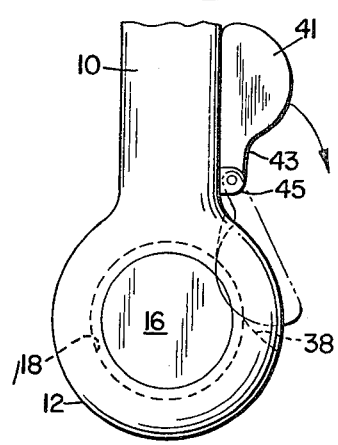
FIG. 8 is a side elevation of FIG. 1 illustrating an alternate disc-type form of unlocking the key in which the disc is pivotally secured to an eye ready for use.

As shown in FIG. 8, the disc 40 may be shaped in modified form as a semi-disc 41 and has a supporting arm. That arm 43 is fastened to the disc at one end to allow the curved surface to extend out as a disc, and the other end is pivotally secured by a pivot 45 to a neighboring position of the bar 10 or ring 12 as a fixed support, so that the unlocking disc or key 41 needs merely to be turned down into groove 38 to depress the detent and unlock the pin 16, as in the dotted line position of this figure.

Figure 2:
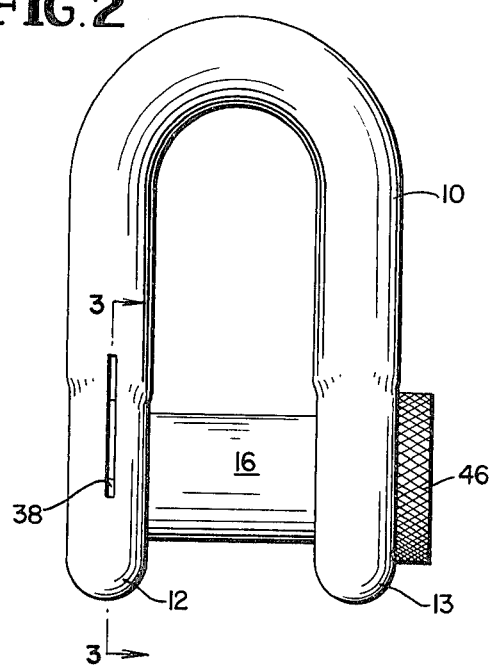
FIG. 2 is an elevational view of the clevis pin of FIG. 1.
Figure 3:
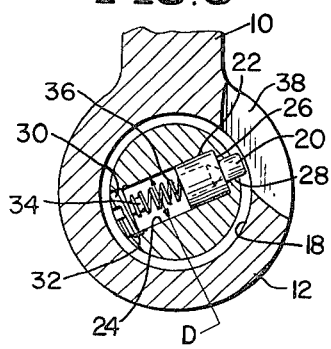
FIG. 3 is a radial section through an eye in side elevation taken on the line 3—3 of FIG. 2.
Figure 4:
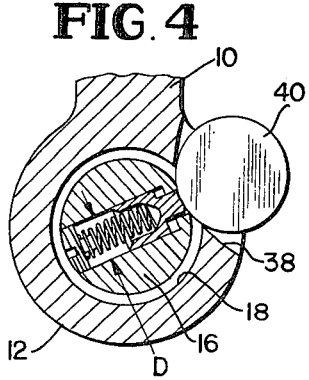
FIG. 4 is a similar view as in FIG. 3 illustrating the manner of unlocking the pin by depressing the detent by a disc or a coin.
Figure 5:
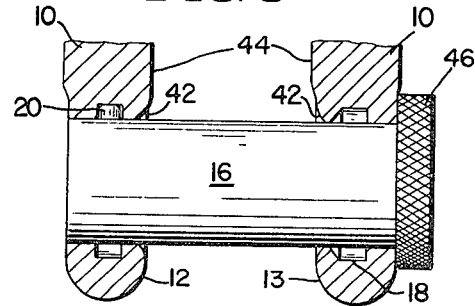
FIG. 5 is similar to FIG. 2 with both eyes cut open and in section to illustrate the mounting of the pin for support therebetween.
Figure 6:
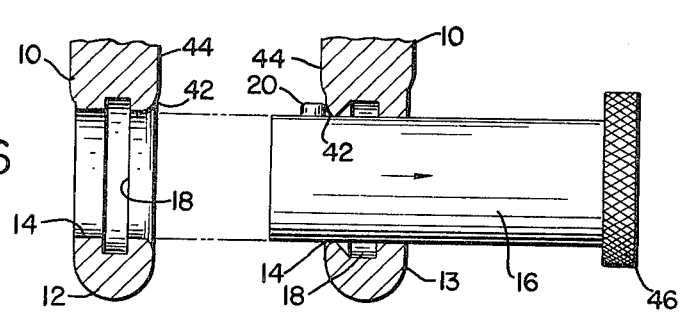
FIG. 6 illustrates the manner of withdrawal of the pin by sliding axially between eyes.

In modified form, the groove 18 in FIG. 13 as well as the chamfer 42, may be omitted, whereby the pin will be retained as shown in FIG. 6 against mere accidental displacement and loss, but without being locked or unlocked, as shown in FIGS. 1 & 2, within the rings 12 & 13. For purposes of easy rotation of the pin manually and to align the detent 22 with the slot 38 ready for unlocking by disc 40, a knuckled knob 46 is mounted on the one outer end of the pin 16.

In handy use the pin will remain locked against accidental displacement in use, it may be unlocked by any disc formed of stiff plastic or metal sized to be inserted within the slot 38. However, that slot 38 will be sized to receive a coin, such as a penny or larger as may be practical for the size of the clevis.

In the modification shown in FIGS. 9–15, the clevis 48 may be sized too small whereby the eyes 50 are sized too small to allow the key receiving slot to be cut therein, which might excessively weaken the eyes unacceptably for the heavy stresses normally placed on a clevis. For these purposes, additional separate washer-like rings 54 are mounted about the ends of the pin 16 adjacent to the outer faces 56. These rings similarly have grooves 18 cut therein concentrically with the bore 14 to receive and retain the tip 20 of a radially biased detent 22 carried radially mounted in an end of the pin 16. The clevis eyes 50 and at least one of said rings has a slot 52 communicating with the annular surface 53 of the pin 16 for depressing the tip 20 of a spring biased detent 22, radially mounted therein as described above, thus to free the pin 16 for axial sliding movement in the rings 54.

The washer-like rings can be loosely supported upon the pin 16 or can be fixedly mounted against the eyes 50 of the clevis face concentric with the bore 14 in each clevis eye, whereby the pin may slide smoothly and axially as shown by the arrows 15 through both eyes. As shown in FIGS. 14 & 15, each inner face 60 of the eyes 50 has an angular gouge 58 cut thereagainst to allow the angle of the gouge to resiliently depress the tip 20 of the detent in axial movement of the pin 16 as it enters an eye 50 for axial movement therethrough. In this case, and as similarly shown in FIG. 11, the disc or coin 38 will be inserted in the slot 52 for depression of the detent 22 and thus unlock the pin for displacement axially of its locked position in either or both rings or washers 54.

Figure 16:
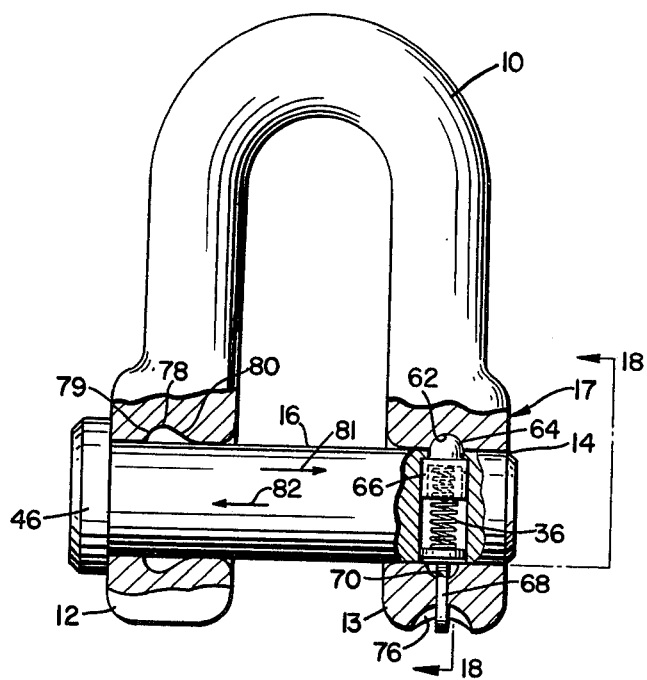
FIG. 16 shows a modified clevis having a locking key resiliently supported in a slot beneath a detent for manual pressure to release the detent and pin 16.
Figure 17:
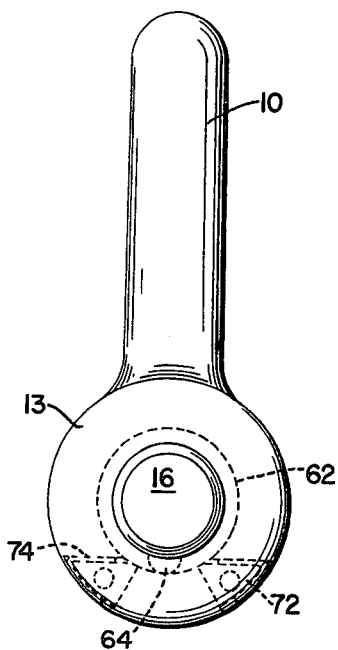
FIG. 17 is a side elevation of FIG. 16.
Figure 18:
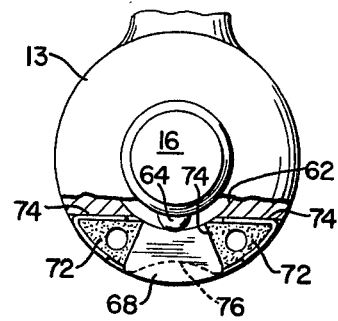
FIG. 18 is a detail showing the construction of FIG. 16 in side elevation.
Figure 19:
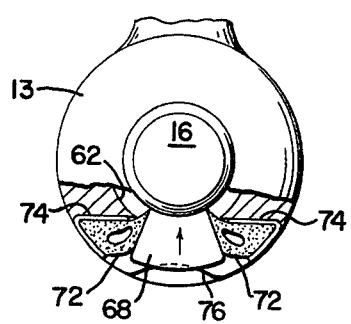
FIG. 19 is a similar detail.

In another modification shown in FIGS. 16, 17 and 18, the circumferential groove 62 is cut shaped in cross section as a semicircle to receive the correspondingly rounded tip 64 of the spring-biased detent. The curvature of the groove 62 holds the detent tip locked therein and serves to lock the pin 16 against axial displacement under locking pressure of the detent spring 36. Nevertheless, since the groove 62 is cut circumferentially in the eye 13, the pin 16 may be rotated in locked position, as in other views by manually turning the knurled knob 46.

A key plate 68 is mounted to slide in a slot 70 with its inner end in contact with the groove 62, whereby the plate 68 will bear against the tip of the detent 64 when the pin 16 and detent therein is rotated to unlocking position. The key plate 68 is resiliently and slidably supported in ready unlocking use between a pair of resilient pads 72 which support the key plate 68 ready for sliding use to bear against the tip of the detent 64. A pair of bent plate brackets 74 support the outer edges of the resilient pads 72 thus to support the key plate 68 allowing resilient unlocking movement in its slot 70.

A finger grip-cut away portion 76 is gouged from the bottom of the eye 13 of the clevis to a depth into which the key plate 68 will extend a displaceable distance, sufficient, while bearing against the tip 64 of the detent to displace the detent in its groove manually from its locking position in groove 62 by inserting a finger in the cut away portion 76 and pressing against the key plate 68 to depress the detent against its spring 36, thus unlocking the pin 16 for axial displacement. In this manner the key plate 68 is resiliently and permanently mounted ready for unlocking use by applying (a) finger pressure thereagainst, allowing easy unlocking of the detent and pin 16 to allow axial sliding movement.

As further shown in FIG. 16, the eye 12 has a locking groove 78 cut therein to retain the pin 16 in open position of the clevis such as shown in the FIGS. 6 and 7. The groove 78 has a steep wall side 79 which will bear against the pin 62 preventing its further removal, locking the pin 16 in the eye 12 against movement in the direction of the arrow 82, that is, in open clevis position. An opposite wall side 80 is tapered in a moderate declination to allow movement of the pin 16 in the direction of the arrow 81, and it will have its detent tip 64 depressed in sliding engagement with the wall 80 in the direction of arrow 81. However, in opposite direction of the arrow 82, the steep wall 79 will retain the tip 64 against further axial displacement.

As thus described, the clevis comprising a bent bar having eyes at each end for support of the pin is provided with means for locking the pin against accidental displacement, and has a groove either in an eye or in an extra ring or washer mounted beside the eye, for receiving and locking a pin against axial movement, thus providing a clevis of great safety and durability in which a pin is secured easily snapped into place and unlocked by a coin or disc. Such pin may similarly be mounted for securement as a closure in a link of a chain, or for other bodies in which a sliding pin operates as a closure or abutment, resistant to great strain and secured against accidental sliding displacement.

Various modifications will occur to those skilled in the art. It will be apparent that the pin hereof may be applicable in many uses in which a pin is easily locked and unlocked against axial movement will be provided. Accordingly, this disclosure is not intended to be limiting, but to be interpreted in the scope of the claims appended hereto.

I claim:

1. The combination of a support comprising a bent bar-like body having ends terminating in eyes provided by bores in each end, the opposed edges of said bores that face each other being chamfered to serve as a guide, and a closure pin or bolt axially slideable and rotatable in said eyes, at least one detent mounted for radial sliding movement in said pin and means radially biasing said detent through the sliding surface of said pin, a retaining area in at least one eye of said support adjacent to said detent and shaped to receive the end of said detent in biased position, locking said pin or bolt against axial movement while allowing rotation in said eyes, a slot cut through an outer surface of at least one of the eyes of said support communicating with the end of said detent in said retaining area and key means insertable in said slot to depress said detent radially releasing said pin for axial movement of said support.

2. The combination as defined in claim 1 wherein said slot is sized and shaped to receive a rigid disc-like key insertable manually in said slot for depressing the end of said detent to release said pin.

3. The combination defined in claim 1 wherein said retaining area is a circumferential groove cut in the area of said support adjacent to the protruding tip of said detent, having walls sized to engage said detent tip locking said pin against axial movement while allowing free rotation of said pin in locked engagement of said tip.

4. The combination defined in claim 3 wherein said annular groove is duplicated in opposite pin support ends of said support means, each groove communicating with a slot cut through an outer support surface, whereby the pin may be locked serially against axial displacement in each groove and be unlocked therefrom by the key alternately insertable in a slot.

5. The combination as defined in claim 1 wherein the support is a pair of eyes in the ends of parallel bent bars of a clevis bored in said bar ends to fit and support said pin at each end in axial sliding movement thereof, said retaining areas comprising grooves circumferentially cut in the eyes of said bars each to receive the resiliently biased tip of said detent, each of said eyes having a slot cut from an outer surface of said bar radially inward to communicate with the center of a groove to receive a key insertable to engage and depress the tip of said detent to unlock said pin for axial movement in said support.

6. The combination defined in claim 5 wherein the inner facing surfaces adjacent the bores of said eyes are angularly cut at the intersection of the bore therewith, slidingly receiving said pin through said angular cut, the angular portion engaging the tip of said detent for depressing the same radially and allow inserting said pin into an eye in axial movement.

7. A bent, bar-like body having ends terminating in eyes provided by bores each to receive a closure pin slideable axially and rotatably mounted in each eye, the opposed edges of said bores that face each other being chamfered to serve as a guide, at least one detent mounted for radial sliding movement in a radial bore near a support end of said pin, said detent being resiliently biased against a stop in said bore with the locking tip of said detent extending outward of the sliding surface of said pin, a circumferentially cut groove in at least one of said eyes cut to receive the locking tip of said radially biased detent, retaining said detent tip and pin against axial movement, and a slot cut radially through an outer surface of each eye communicating with said groove and the locking tip of said detent therein to receive a key to depress said detent tip for unlocking and allowing axial movement of said pin in said eye.

8. The combination defined in claim 7 wherein the inner facing surfaces adjacent the bores of said eyes are angularly cut at the intersection with the bore therewith, slidingly receiving said pin through said angular cut, the angular portion engaging the tip of said detent for depressing the same radially and allow inserting said pin into an eye in axial movement.

9. A bent, bar-like body having ends terminating in eyes, a ring-mounted adjacent to a face of each eye with both eyes and rings coaxially bored to receive and support a closure pin slidable axially through each eye and ring, at least one detent having a locking tip mounted for radial sliding movement in a radial bore of said pin in the area of support by a ring, said detent being resiliently biased against a stop in said radial bore with the locking tip of said detent extending outward of the sliding surface of said pin, a groove in said ring cut to receive the locking tip of said radially biased detent retaining said detent tip and pin against axial movement, and a slot cut radially through an outer surface of each ring communicating with said groove and locking tip of said detent therein to receive a key inserted to depress said detent locking tip, thereby unlocking and allowing axial movement of said pin in through said ring and eye.

10. The combination defined in claim 9 wherein the inner facing surfaces adjacent the bores of said eyes are angularly cut at the intersection of the bore therewith, slidingly receiving said pin through said angular cut, the angular portion engaging the tip of said detent for depressing the same radially and allow inserting said pin into an eye in axial movement.

11. The combination defined in claim 9 wherein said annular groove is duplicated in opposite pin support ends of said support rings, each groove communicating with a slot cut through an outer support surface, whereby the pin may be locked serially against axial displacement in each groove and be unlocked therefrom by the key alternately insertable in a slot.

12. The combination defined in claim 1 wherein the combination support and bolt is a clevis having a lockable axial sliding bolt through both eyes.

13. The combination defined in claim 1 wherein the combination support and bolt is a link in a chain closed by said lockable bolt.

14. The combination defined in claim 9 wherein the combination support and bolt is a clevis having a lockable axial sliding bolt through both eyes.

15. The combination defined in claim 9 wherein the combination support and bolt is a link in a chain closed by said lockable bolt.

16. The combination as defined in claim 7 wherein the key is at least partially curved as a disc-like body and includes means pivotally securing said key to the bar, operative in pivotal movement to enter said slot to depress said detent and release said pin for axial movement.

17. The combination as defined in claim 1 wherein the outer portion of said slot is cut away to form a depression in said outer support surface, a key plate is mounted in said slot for sliding movement therein and sized to allow its inner end to be positioned against the tip of said detent and its outer end extending into said depression away a distance corresponding to the depth of said retaining area, whereby said key plate may be manually depressed sliding in said slot against said detent tip displacing the same radially to release said pin, and means resiliently supporting said key plate in sliding position in said slot.

18. The combination as defined in claim 17 wherein said key plate is resiliently supported in said slot in frictional engagement between elastic pads.

* * * * *